US009059817B2

(12) United States Patent
Huang et al.

(10) Patent No.: US 9,059,817 B2
(45) Date of Patent: Jun. 16, 2015

(54) MINIMIZING NETWORK LATENCY IN INTERACTIVE INTERNET APPLICATIONS

(75) Inventors: Cheng Huang, Redmond, WA (US); Jin Li, Sammamish, WA (US); Sanjeev Mehrotra, Kirkland, WA (US); Philip A. Chou, Bellevue, WA (US); Felix Livni, Seattle, WA (US); Hao Chen, Redmond, WA (US); Jay Thaler, Kirkland, WA (US); Chao Zhang, Brooklyn, NY (US); Keith W. Ross, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 979 days.

(21) Appl. No.: 12/951,908

(22) Filed: Nov. 22, 2010

(65) Prior Publication Data
US 2012/0128010 A1 May 24, 2012

(51) Int. Cl.
*H04J 3/16* (2006.01)
*H04L 12/26* (2006.01)
*H04J 3/00* (2006.01)
*H04L 1/00* (2006.01)
*H04L 1/18* (2006.01)

(52) U.S. Cl.
CPC ............ *H04L 1/0009* (2013.01); *H04L 1/1812* (2013.01); *H04L 1/188* (2013.01)

(58) Field of Classification Search
None
See application file for complete search history.

(56) References Cited

U.S. PATENT DOCUMENTS

| 2002/0054578 A1* | 5/2002 | Zhang et al. | 370/328 |
|---|---|---|---|
| 2002/0069038 A1* | 6/2002 | Cooper | 702/191 |
| 2006/0031738 A1* | 2/2006 | Fay et al. | 714/758 |
| 2008/0244001 A1 | 10/2008 | Fang | |
| 2009/0125967 A1* | 5/2009 | Perlman et al. | 725/133 |
| 2010/0094950 A1* | 4/2010 | Zuckerman et al. | 709/213 |
| 2010/0195488 A1 | 8/2010 | Mehrotra et al. | |

OTHER PUBLICATIONS

Byers, et al. "Informed Content Delivery Across Adaptive Overlay Networks." Proceedings of the 2002 Conference on Applications, Technologies, Architectures, and Protocols for Computer Communications (SIGCOMM '02), Aug. 19-23, 2002, pp. 47-60, Pittsburgh, PA, USA.
Byers, et al. "A Digital Fountain Approach to Reliable Distribution of Bulk Data." ACM SIGCOMM Computer Communication Review, Oct. 1998, pp. 56-67, vol. 28, is. 4. ACM: New York, NY, USA.

(Continued)

*Primary Examiner* — Samina Choudhry
(74) *Attorney, Agent, or Firm* — Aaron Chatterjee; Kate Drakos; Micky Minhas

(57) ABSTRACT

A method and system that enhances a user's performance while interacting with an interactive internet application such as a Massively Multiplayer Online (MMO) game is provided. The network latency experienced by users participating in the MMO game is minimized by dynamically determining an optimal transmission action for a message generated by the MMO game. In one embodiment, determining the optimal transmission action for a message includes dynamically determining the optimal number of redundant Forward Error Correction (FEC) packets to add to a message prior to transmitting a message to a receiving device. The optimal number of FEC packets is determined based on a wide range of varying network conditions.

11 Claims, 10 Drawing Sheets

(56) References Cited

OTHER PUBLICATIONS

Maymounkov, Petar and David Mazieres. "Rateless Codes and Big Downloads." Proceedings of the 2nd International Workshop on Peer-to-Peer Systems (IPTPS'03), Feb. 20-21, 2003, pp. 1-6, Berkeley, CA, USA.

Chou, Philip A., Yunnan Wu and Kamal Jain. "Practical Network Coding." Proceedings of the 41st Annual Allerton Conference on Communication, Control, and Computing, Oct. 2003, pp. 1-20, Monticello, IL, USA.

Gkantsidis, Christos and Pablo Rodriguez Rodriguez. "Network Coding for Large Scale Content Distribution." Proceedings of the 24th Annual Joint Conference of the IEEE Computer and Communications Societies. (INFOCOM '05), Mar. 13-17, 2005, pp. 2235-2245, vol. 4, Miami, FL, USA.

Balakrishnan, et al. "Ricochet: Lateral Error Correction for Time-Critical Multicast." Proceedings of the 4th USENIX Symposium on Networked Systems Design & Implementation (NSDI '07), Apr. 11-13, 2007, pp. 1-14, Cambridge, MA, USA.

Balakrishnan, et al. "Maelstrom: Transparent Error Correction for Lambda Networks." Proceedings of the 5th USENIX Symposium on Networked Systems Design & Implementation (NSDI '08), Apr. 16-18, 2008, pp. 1-15, San Francisco, CA, USA.

Bolot, Jean-Chrysostome, Sacha Fosse-Parisis and Don Towsley. "Adaptive FEC-Based Error Control for Internet Telephony." Proceedings of the Eighteenth Annual Joint Conference of the IEEE Computer and Communications Societies (INFOCOM '99), Mar. 21-25, 1999, pp. 1453-1460, vol. 3, New York, NY, USA.

"Udpcast commandline options." UDPcast [online], Feb. 17, 2007, pp. 1-5. Retrieved from the Internet on Aug. 23, 2010: URL: <http://udpcast.linux.lu/cmd.html>.

Gurses, Eren, Gozde Bozdagi Akar and Nail Akar. "Optimal Packet Scheduling and Rate Control for Video Streaming." SPIE Conference on Visual Communications and Image Processing 2007 (VCIP'07), Jan. 28-Feb. 1, 2007, pp. 1-8, San Jose, California, USA.

Begen, Ali C. "Enhancing the Multimedia Experience in Emerging Networks." D.Phil Thesis to the School of Electrical and Computer Engineering, Georgia Institute of Technology, Dec. 2006, pp. 1-203, Atlanta, Georgia, USA.

Ghosh, Preetam, Kalyan Basu and Sajal K. Das. "A Cross-Layer Design to Improve Quality of Service in Online Multiplayer Wireless Gaming Networks." Proceedings of the 2nd International Conference on Broadband Networks, Oct. 3-7, 2005, pp. 813-822, vol. 2, Boston, MA, USA.

"Project-Team reso: Optimized protocols and software for high performance networks." Activity Report, 2005, Institut National De Recherche en informatique et en automatique (INRIA): Rhone-Alpes, pp. 1-34.

Kenyon, Robert V. and Jason Leigh. "Networked Virtual Environments and Rehabilitation." Proceedings of the 26th Annual International Conference of the IEEE Engineering in Medicine and Biology Society (IEMBS '04), Sep. 1-5, 2004, pp. 4832-4835, San Francisco, CA, USA.

Dyck, Jeff and Carl Gutwin. "Improving Groupware Performance in Lossy Networks with Adaptive Forward Error Correction." Technical Report HCI-TR-2002-01. 2002.

"Networking." Yang's Wiki [online], pp. 1-13. Retrieved from the Internet on Aug. 23, 2010: URL: <http://yz.mit.edu/notes/Networking?revision=e09d65f82210d613ba8d86e3362096eba215-1145>.

Chang, Hyunseok, Sugih Jamin and Wenjie Wang. "Live Streaming Performance of the Zattoo Network." Proceedings of the 2009 Internet Measurement Conference (IMC'09), Nov. 4-6, 2009, pp. 1-13, Chicago, Illinois, USA.

Nonnenmacher, Jorg, Ernst Biersack and Dan Towsley. "Parity-Based Loss Recovery for Reliable Multicast Transmission." Transactions on Networking, Aug. 1998, pp. 349-361, vol. 6, is. 4, IEEE/ACM: New York, NY, USA.

Rubenstein, et al. "Improving Reliable Multicast Using Active Parity Encoding Services (APES)." Proceedings of the Eighteenth Annual Joint Conference of the IEEE Computer and Communications Societies (INFOCOM'99), Mar. 21-25, 1999, pp. 1248-1255, New York, NY, USA.

"The World's Most Intriguing Startups: zynga." Bloomberg Businessweek [online], Nov. 12, 2009, pp. 1-3. Retrieved from the Internet on Aug. 23, 2010: URL: <http://images.businessweek.com/ss/09/11/1112_most_intriguing_companies/26.htm>.

"The 25 Largest Facebook Games as 2010 Begins." Inside Facebook [online], Jan. 4, 2010, pp. 1-6. Retrieved from the Internet on Aug. 23, 2010: URL: <http://www.insidefacebook.com/2010/01/04/the-25-largest-facebook-games-as-2010-begins/>.

Liew, Jeremy. "Why the Economics of Social Gaming Are so Attractive to Investors." paidContent.org—The Economics of Digital Content [online], Dec. 1, 2009, pp. 1-5. Retrieved from the Internet on Aug. 23, 2010: URL: <http://paidcontent.org/article/419-why-the-economics-of-social-gaming-are-so-attractive-to-investors>.

Jiang, Hao and Constantinos Dovrolis. "Passive Estimation of TCP Round-Trip Times." Technical report, ACM Computer Communications Review, Aug. 2002, pp. 75-88, vol. 32, is. 3. ACM: New York, NY, USA.

Allman, Mark, Wesley M. Eddy and Shawn Ostermann. "Estimating Loss Rates with TCP." ACM SIGMETRICS Performance Evaluation Review, Dec. 2003, pp. 12-24, vol. 31, is. 3. ACM: New York, NY, USA.

Allman, Mark and Vern Paxson. "On Estimating End-to-End Network Path Properties." Proceedings of the the 1999 Conference on Applications, Technologies, Architectures and Protocols for Computer Communication (SIGCOMM'99), Aug. 1999, pp. 263-274, Cambridge, MA, USA.

Haeberlen, et al. "Monarch: A Tool to Emulate Transport Protocol Flows over the Internet at Large." Proceedings of the 2006 Internet Measurement Conference (IMC'06), Oct. 25-27, 2006, pp. 1-14, Rio de Janeiro, Brazil.

Mondal, Amit and Aleksandar Kuzmanovic. "Removing Exponential Backoff from TCP." ACM Computer Communication Review, Oct. 2008, pp. 1-10, vol. 38, is. 5. ACM: New York, NY, USA.

Vasudevan, et al. "Safe and Effective Fine-grained TCP Retransmissions for Datacenter Communication." Proceedings of the 2009 Conference on Applications, Technologies, Architectures and Protocols for Computer Communication (SIGCOMM '09), Aug. 17-21, 2009, pp. 303-314, Barcelona, Spain.

Chou, Philip A. and Zhourong Miao. "Rate-Distortion Optimized Streaming of Packetized Media." Microsoft Technical Report, Feb. 2001, pp. 1-44. Microsoft Research: Redmond, WA, USA.

Beutler, Frederick J. and Keith W. Ross. "Optimal Policies for Controlled Markov Chains with a Constraint," Journal of Mathematical Analysis and Application, Nov. 15, 1985, pp. 236-256, vol. 112. Elsevier: Amsterdam, The Netherlands.

Beringer, Fred. "High performance at massive scale—Lessons learned at Facebook." Fred Beringer [online], Oct. 29, 2009, pp. 1-7. Retrieved from the Internet on Aug. 23, 2010: URL: <http://www.fredberinger.com/high-performance-at-massive-scale-lessons-learned-at-facebook>.

"Low Extra Delay Background Transport (ledbat) Internet Drafts." Internet Society [online], pp. 1-3. Retrieved from the Internet on Aug. 23, 2010: URL: <http://www.isoc.org/>.

Rhee, Injong and Srinath R. Joshi. "FEC-based Loss Recovery for Interactive Video Transmission—Experimental Study." Proceedings of IEEE International Conference on Multimedia Computiing and Systems, Jun. 1999, pp. 250-256, vol. 1, Florence, Italy.

Bolot, Jean-Chrysostome and Andres Vega-Garcia. "The Case for FEC-Based Error Control for Packet Audio in the Internet." ACM Multimedia Systems, to appear.

\* cited by examiner

MINIMIZING NETWORK LATENCY IN INTERACTIVE INTERNET APPLICATIONS

BACKGROUND OF THE INVENTION

Massively Multiplayer Online (MMO) games are multi-player games that enable large numbers of players to participate in game play simultaneously in a real-time shared virtual world that they are connected to, via the Internet. To support a virtual world, MMO's typically utilize one or more servers, where players connect to the servers to participate in game play. Due to their interactive nature, MMO games typically have stringent latency requirements. However, a user's perceived performance while participating in a MMO game may typically be affected by latency, delay variation, and packet loss in the Internet. In addition, users in different geographical locations may experience different network latencies while participating in a MMO game. This may result in each user interacting with the MMO game at different points in time, thereby affecting the user's overall interactivity with the MMO game.

SUMMARY

Disclosed herein is a method and system that enhances a user's performance while interacting with a MMO game by minimizing network latency. In one embodiment, the disclosed technology minimizes the network latency experienced by users by determining an optimal transmission policy for a message prior to and during transmission of the message to a receiving device. The optimal transmission policy determines the optimal number of FEC packets to be added to the message prior to and during transmission of the message to the receiving device. The optimal policy is determined by dynamically adapting to a wide range of varying network conditions. The optimal number of FEC packets is determined based on a wide range of varying network conditions.

In one embodiment, the disclosed technology implements a message-oriented, connectionless User Datagram Protocol (UDP)-based transport protocol that provides the MMO game with a variety of transport layer services. The UDP-based transport protocol includes an intelligent adaptive decision making engine. The intelligent adaptive decision making engine dynamically determines the optimal number of FEC packets to be added to a message generated by the MMO game prior to and during transmission of the message to a receiving device, while minimizing a transmission cost and message delivery latency associated with transmitting the message to the receiving device.

In another embodiment, a method for balancing a transmission cost and network latency associated with transmitting a message generated by an interactive internet application is disclosed. The method includes obtaining one or more network performance parameters associated with a message generated by an interactive internet application. The method further includes determining an optimal transmission action for the message based on the network performance parameters and the number of information packets to be transmitted in the message. An optimal transmission action is determined that minimizes a transmission cost and network latency associated with transmitting the message to a receiving device, subject to a constraint that a probability of arrival of the message after some network latency tolerance is below a certain threshold value.

DETAILED DESCRIPTION

In order to minimize network latency experienced by users, an optimal transmission strategy is determined for a message generated by an interactive internet application, such as a MMO game. In one embodiment, determining the optimal transmission strategy comprises dynamically determining the optimal number of redundant Forward Error Correction (FEC) packets to add to a message prior to and during transmission of the message to a receiving device. The disclosed technology adapts to a wide range of varying network conditions such as the network latency, round trip time and packet loss probability to dynamically determine the optimal transmission action to perform for a message that is to be transmitted. In one embodiment, a Markov Decision Process (MDP) framework is utilized to determine the optimal transmission action for a message. In one approach, the optimal transmission action for a message is pre-computed offline and stored as a look-up table. The optimal transmission action for a message is dynamically chosen during online execution by utilizing the appropriate look-up table based on the current state of the network and the number of information packets in the message that need to be transmitted to the receiving device.

Figure 1A:
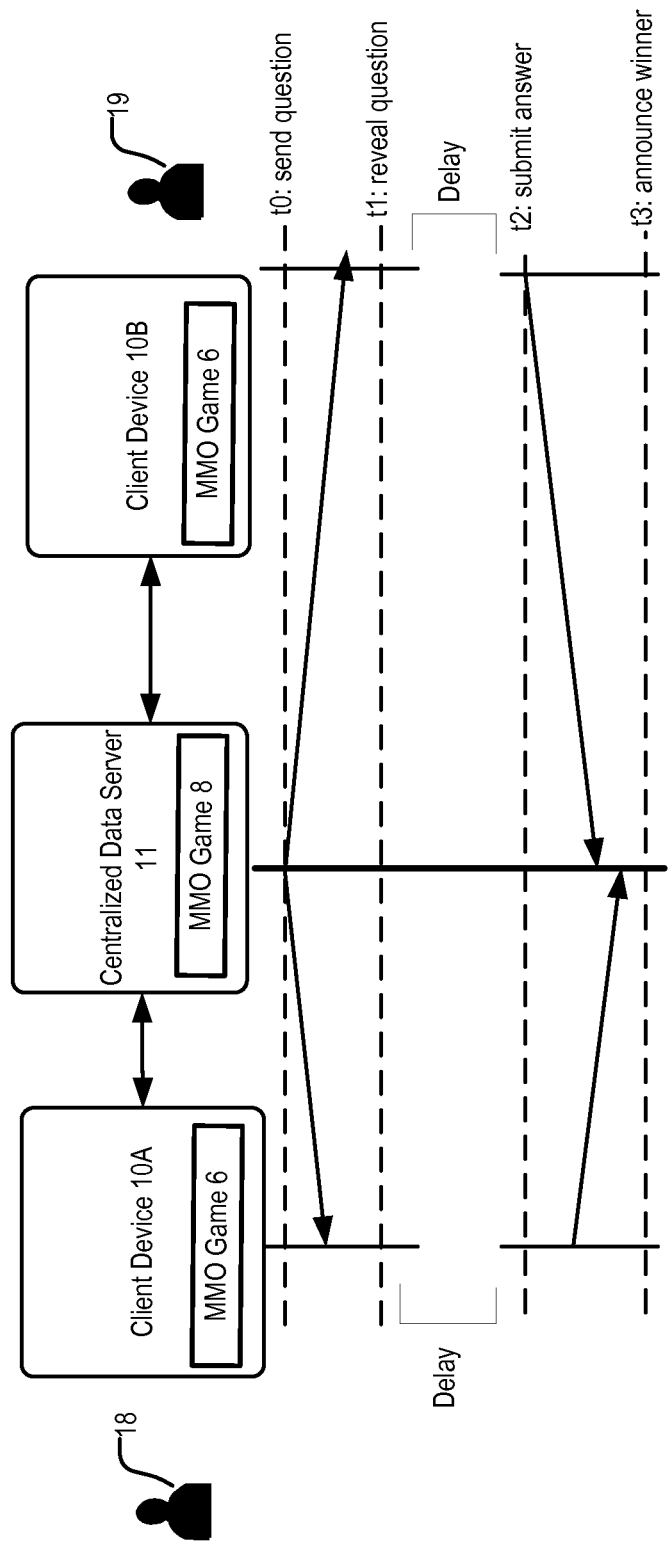
FIG. 1A illustrates an exemplary environment for implementing the disclosed technology.

FIG. 1A illustrates an exemplary environment for implementing the disclosed technology. FIG. 1A illustrates two users 18, 19 at client devices 10A, 10B participating in a massively multiplayer online (MMO) game with each other by connecting to a centralized data server 11. Centralized data server 11 executes a sever portion of the MMO game 8 so as to provide the MMO game 8 to client devices 10A, 10B. It should be noted that although FIG. 1A shows two client devices 10A, 10B interacting with one centralized data server 11, the present technology may be utilized to support any number of client devices and any number of servers in other embodiments.

FIG. 1A describes an exemplary operation of an MMO game. In a typical operation, centralized data server 11 sends a multiple choice question to users 18, 19 at a time, t0. However, due to network latency, latency variation and packet loss, users 18, 19 may receive the question at different times. To ensure that the game is fair to all users, server 11 may reveal the question to users 18, 19 at the same time, based on a single timestamp from a global virtual clock (for example, client devices 10A and 10B may be synchronized with the server 11 on the same virtual clock). Accordingly, a user closer to the centralized data server 11 will not see the question earlier and thus have an unfair advantage. Therefore, at the moment the question is created, centralized data server 11 may determine how far into the future the question is to be revealed to users 18, 19. Intuitively, the question-reveal delay, (t1−t0), shown in FIG. 1A should be large enough so that users 18, 19 receive the question by the reveal time, t1. After the question is revealed, each of the users 18, 19 selects an answer and submits it to the centralized data server 11 after a certain deadline, t2. Centralized data server 11 collects the answers from users 18, 19 before it aggregates all the results and announces the winner at time t3. To keep the game exciting and engaging, it is important that winners be announced shortly after the answer deadline. At the same time, the submit-announce delay, (t3−t2), shown in FIG. 1A needs to be long enough so that each of the users 18, 19 can get their results in. In both phases (revealing the question and announcing the result), if the delay is too small, due to network latency and packet loss, users 18, 19 may not see the question on time, or will not be able to get their answers to the centralized data server 11 before the deadline, thus making the game unfair. On the other hand, if the network latency is too large, the progress of the MMO game 6, 8 is slowed, thereby affecting the interactivity of the game.

The disclosed technology enhances a user's performance while interacting with the MMO game by minimizing the maximum latency experienced by the users. In one embodiment, the disclosed technology minimizes the number of original data packet re-transmissions while transmitting messages between the client devices and the centralized server by dynamically determining the optimal number of redundant Forward Error Correction (FEC) packets to add to a message prior to and during transmission of the message to a receiving device to minimize the latency experienced by all users participating in the game. The operations performed by the disclosed technology are discussed in detail below.

Figure 1B:
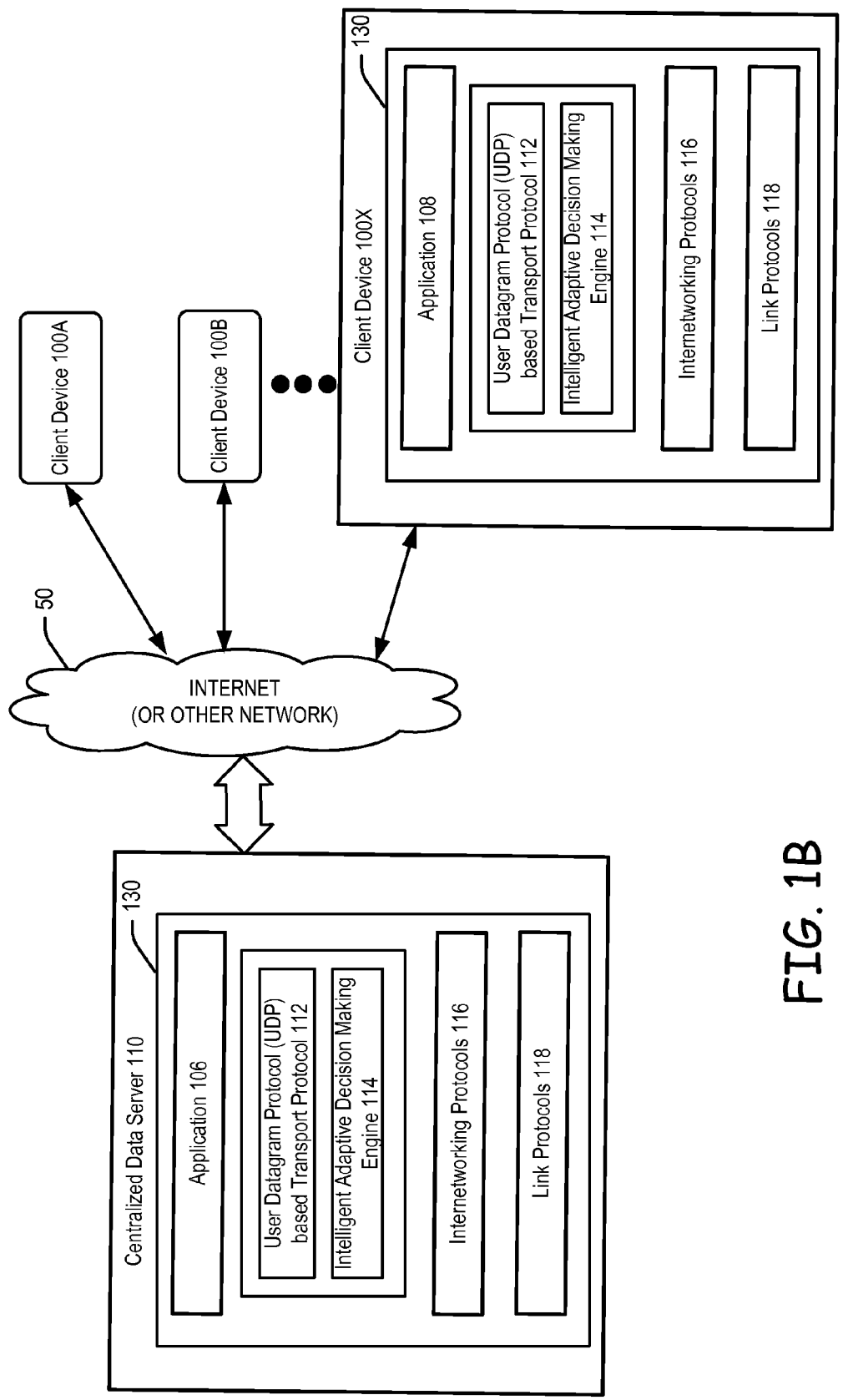
FIG. 1B illustrates a system for implementing the present technology.

FIG. 1B illustrates a system for implementing the present technology. Client devices 100A, 100B . . . 100X communicate with a centralized data server 110 over an underlying network 50. The network 50 may comprise the Internet, although other networks such as a LAN or WAN are contemplated. Client devices 100A, 100B . . . 100X may include a gaming and media console, a personal computer, or one or more mobile devices such as, for example, a cell phone, a Internet-enabled smart phone, a personal digital assistant, a palmtop computer, a laptop computer, tablet computing device, smart appliance, etc.

In one embodiment, client devices 100A, 100B . . . 100X and the centralized data server 110 may operate within a layered network communications framework 130. The framework 130 enables client devices 100A, 100B . . . 100X and the centralized data server 110 to receive and transmit information between each other over the underlying network 50 and provides a collection of services that applications 106, 108 running on client devices 100A, 100B . . . 100X and the centralized data server 110 may be invoked and utilized. As illustrated, applications 106, 108 may be hosted in an upper-most layer of the layered network communications framework 130 on each of the client devices 100A, 100B . . . 100X and the centralized data server 110. In one embodiment, applications 106, 108 generate messages that include a sequence of one or more information packets which can either be communicated to another local application hosted on the same device, or can be communicated over the network 50 to a remote application 108 hosted on the centralized data server 110. In one example, applications 106, 108 may comprise an interactive internet application such as a massively multi-player online (MMO) game.

In one embodiment, a message-oriented, connectionless User Datagram Protocol (UDP)-based transport protocol 112 is implemented in a layer immediately beneath applications 106, 108 on each of the client devices 100A, 100B . . . 100X and the centralized data server 110, as shown in FIG. 1B. The UDP-based transport protocol 112 provides applications 106, 108 with a variety of transport layer services which enable applications 106, 108 to communicate with each other and as necessary over the network 50. In one embodiment, the disclosed UDP-based transport protocol 112 comprises an intelligent adaptive decision making engine 114. FIG. 7, discussed below, describes an exemplary architecture of the disclosed message-oriented, connectionless UDP-based protocol that comprises an intelligent adaptive decision making engine. In one embodiment, the intelligent adaptive decision making engine 114 minimizes the maximum latency experienced by users by determining an optimal transmission action for a message transmitted between the client devices 100A, 100B . . . 100X and the centralized data server 110. In one embodiment, determining an optimal transmission action comprises dynamically determining the optimal number of redundant Forward Error Correction (FEC) packets to add to the message prior to and during transmission of the message to a receiving device. In addition, the disclosed intelligent adaptive decision making engine 114 adapts to a wide range of varying network conditions to dynamically determine the optimal number of FEC packets to add to a message. The operations performed by the intelligent adaptive decision making engine 114 are described below in detail with respect to FIGS. 4-8.

A suite of internetworking protocols 116 operate in a layer immediately beneath the UDP-based transport protocol 112 and a suite of link protocols 118 operate in a layer immediately beneath the internetworking protocols on each of the client devices 100A, 100B . . . 100X and the centralized data server 110. The internetworking protocols 116 and link protocols 118 together provide a variety of lower-level network communication services which facilitate the actual transmission of information packets between the client devices 100A, 100B . . . 100X and the centralized data server 110.

Figure 2:
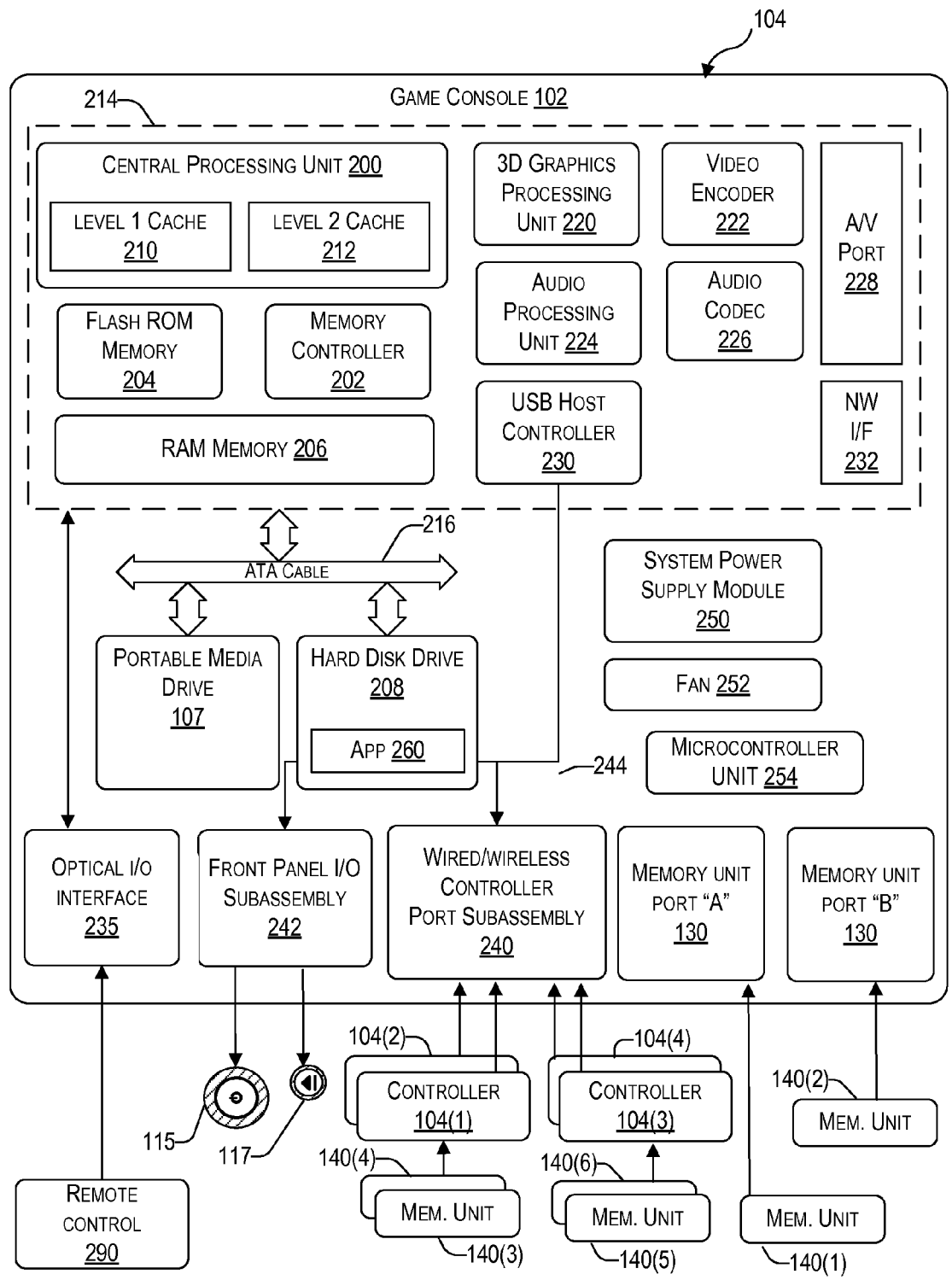
FIG. 2 illustrates an example of a computing device that may be used to implement the client devices and the centralized data server shown in FIGS. 1A-1B.

FIG. 2 illustrates an example of a computing device architecture 104 that may be used to implement the client devices 100A, 100B . . . 100X and/or the centralized data server 110 shown in FIG. 1B. In one embodiment, the computing device 104 of FIG. 2 may be a multimedia console 102, such as a gaming console. As shown in FIG. 2, the multimedia console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 107. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 107 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 115, the eject button 117, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 104 may be operated as a standalone system by simply connecting the system to monitor 150 (FIG. 1), a television, a video projector, or other display device. In this standalone mode, gaming and media system 104 enables one or more players to play games, or enjoy digital media, e.g., by watching movies, or listening to music. However, with the integration of broadband connectivity made available through network interface 232, gaming and media system 104 may further be operated as a participant in a larger network gaming community.

Figure 3:
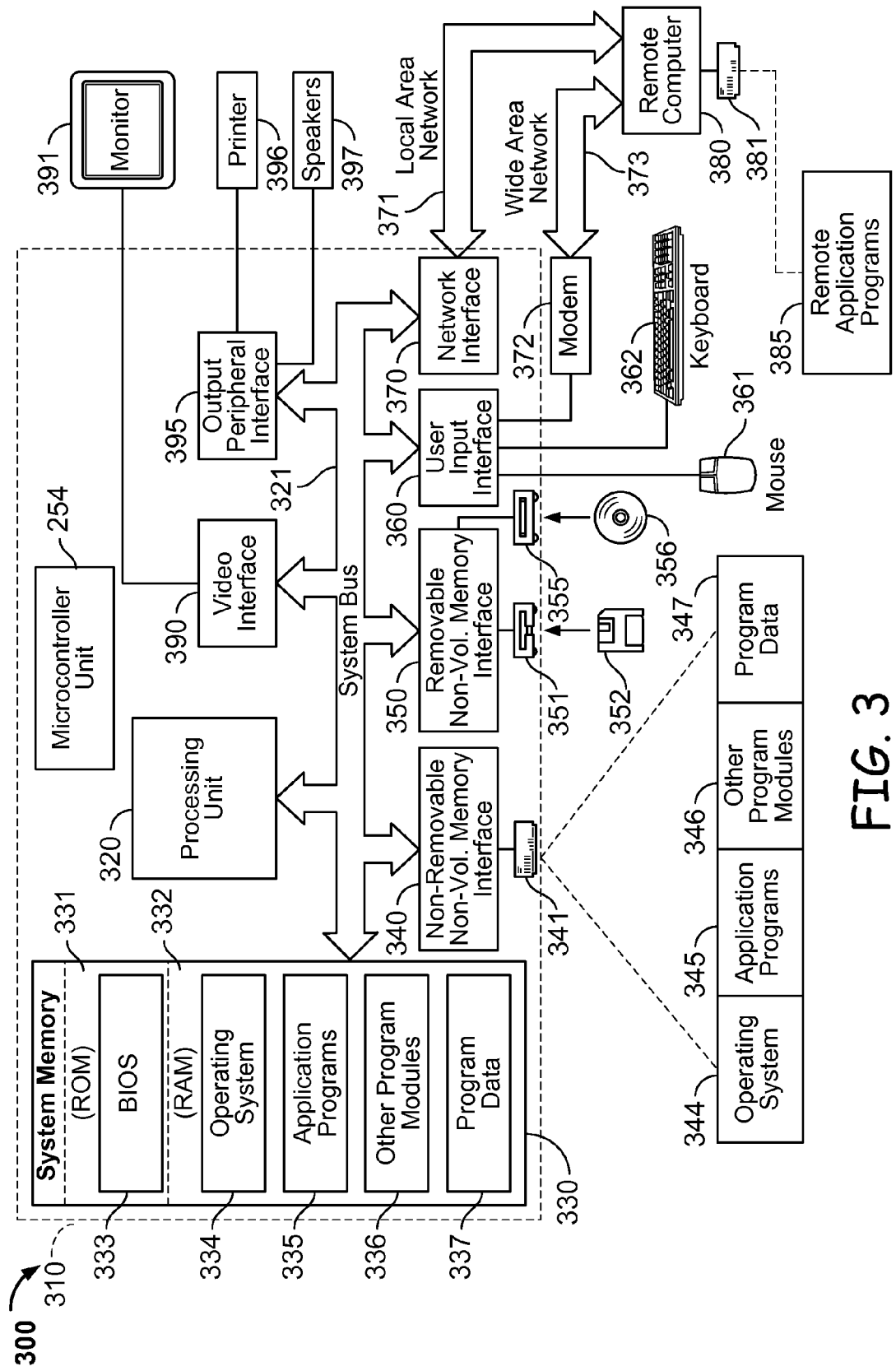
FIG. 3 illustrates a general purpose computing device which can be used to implement another embodiment of client devices and the centralized data server shown in FIGS. 1A-1B.

FIG. 3 illustrates a general purpose computing device architecture which can be used to implement another embodiment of client devices 100A, 100B . . . 100X and the centralized data server 110 shown in FIG. 1B. With reference to FIG. 3, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during startup, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337.

The computer 310 may also include other removable/non-removable, volatile/nonvolatile computer storage media. By way of example only, FIG. 4 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

The hardware devices of FIGS. 1-4 discussed above can be used to implement a system that determines an optimal transmission action for a message transmitted between one or more client devices 100A, 100B . . . 100X and the centralized data server 110. In one embodiment, and as discussed above, the optimal transmission action determines the optimal number of FEC packets to add to a message prior to and during transmission of the message between the client devices 100A, 100B . . . 100X and the centralized data server 110.

Figure 4A:
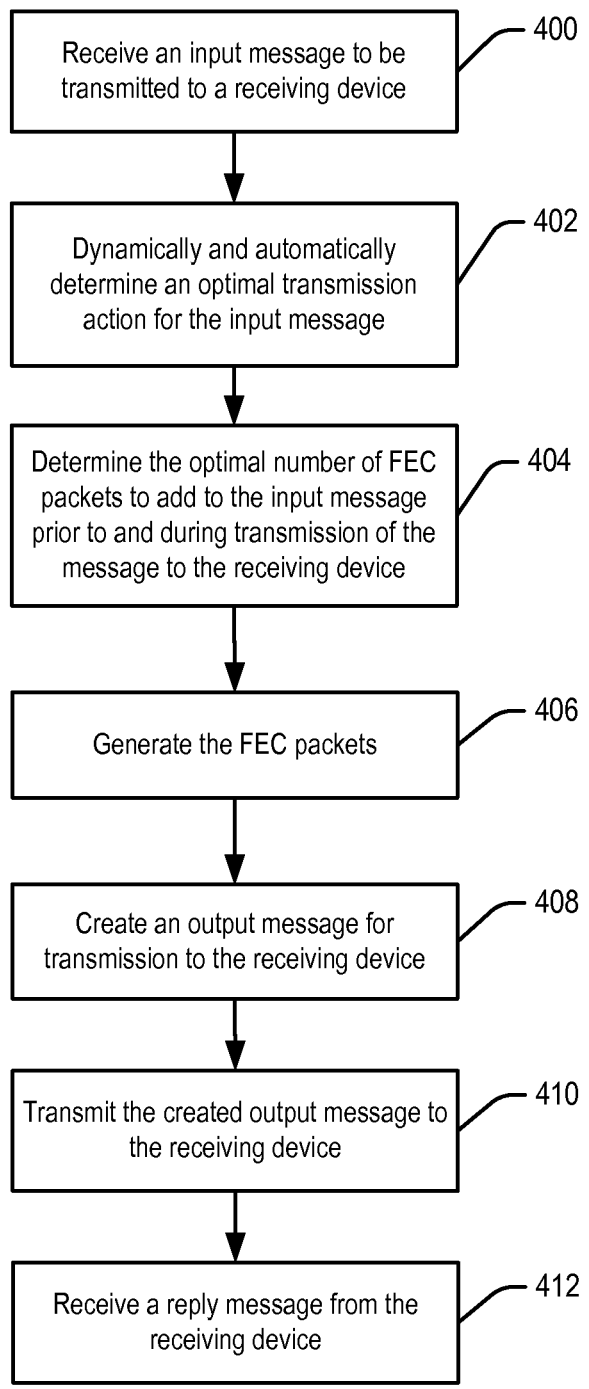
FIG. 4A is a flowchart describing a process for determining an optimal transmission strategy for a message generated by an interactive internet application.
Figure 4B:
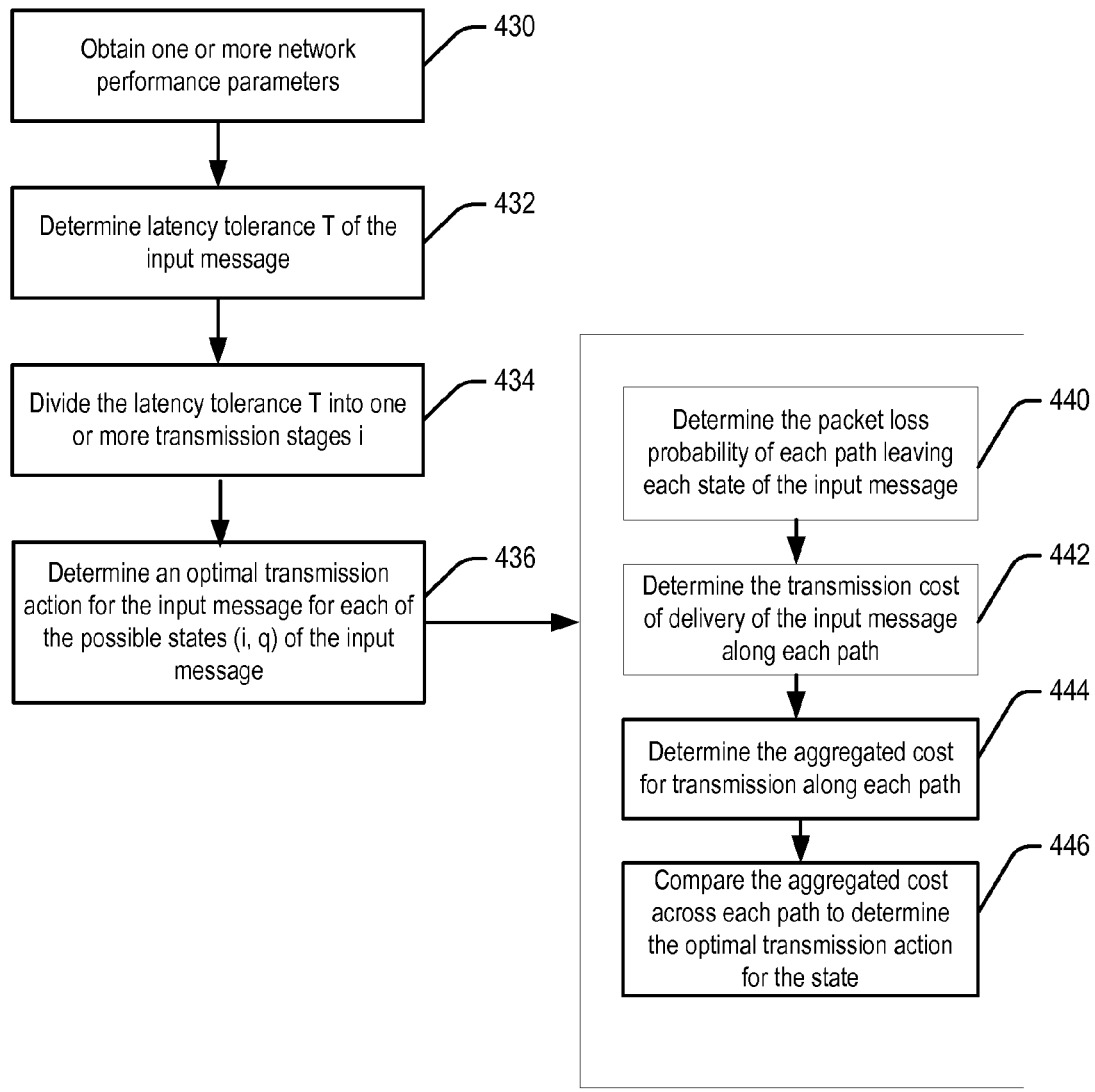
FIG. 4B is a flowchart describing a process for dynamically determining an optimal transmission action for a message transmitted between one or more client devices and a centralized data server.

FIG. 4A is a flowchart describing a process for determining an optimal transmission strategy for a message generated by an interactive internet application. In one embodiment, the steps of FIG. 4A may be performed by the intelligent adaptive decision engine 114 shown in FIG. 1B. In step 400, an input message consisting of one or more information packets to be transmitted to a receiving device is received. In one example, the input message may be generated by a user participating in an interactive internet application such as the MMO game shown in FIG. 1A. In step 402, an optimal transmission action for the input message is dynamically and automatically determined based on monitoring one or more network performance parameters in real-time and based on the number of information packets in the message. The optimal transmission action includes sending all the information packets in the original message and an optimal number of forward error correction (FEC) packets. In one embodiment, the optimal transmission action is defined as minimizing the transmission cost subject to a constraint on the network latency or network reliability. Other definitions of optimality may be defined, in other embodiments. FIG. 4B describes the process of performing step 402 in detail. In step 404, an optimal number of redundant forward error correction (FEC) packets to be added to the input message prior to and during transmission of the input message to the receiving device are determined, resulting in the optimal transmission action. The optimal transmission action is determined prior to transmitting the message, given the network characteristics. Given the optimal transmission action, the optimal number of FEC packets to be added to the message during the first transmission stage of the message, is a deterministic value. The optimal number of FEC packets to be added during later transmission stages, is however not deterministic and may be determined at the beginning of each stage based on the actual packet losses that occurred during previous transmission stages.

In step 406, the FEC packets are generated. In step 408, an output message consisting of the information packets in the original message and the optimal number of FEC packets is created. In step 410, the output message is transmitted to the receiving device. In step 412, a reply message is received from the receiving device. The reply message acknowledges the number of packets received. The actual number of packets received by the receiving device is a function of the network characteristics. Depending on how many packets from the message have been received, the sending device may have to resend some of the packets. Therefore, the sending device again determines an optimal transmission action which consists of sending at least the number of missing packets in the message and an optimal number of FEC packets. This process is repeated until the entire message is sent or until some network latency tolerance is reached.

FIG. 4B is a flowchart describing a process for dynamically determining an optimal transmission action for a message transmitted between one or more client devices and a centralized data server. FIG. 4B describes a process of performing step 402 in FIG. 4A.

In step 430, one or more network performance parameters are obtained. In one example, the network performance parameters include the round trip time (RTT), the network latency and packet loss probability of a message transmitted between the client devices 100A, 100B . . . 100X and the centralized data server 110. Alternatively, these parameters may be determined dynamically during each session using prior data transmissions to learn them. In one example, the RTT, network latency and packet loss probability may be obtained by analyzing packet level traces from prior MMO game sessions executed in the client devices 100A, 100B . . . 100X and the centralized data server 110. As used herein, the network latency refers to the interval of time between when a message is transmitted from one or more of the client devices 100A, 100B . . . 100X over the network 50 to when the message is successfully received over the network 50 by the centralized data server 110, or vice-versa. The term round-trip time as used herein refers to the latency time plus the time it takes for the one or more client devices 100A, 100B . . . 100X to receive an acknowledgement over the network 50 from the centralized data server 110 that it has successfully received a particular message, or vice versa.

In step 432, the latency tolerance of the input message is determined. In one embodiment, the latency tolerance is defined as a threshold time T of arrival of a percentage of messages. In one embodiment, it is desirable that the percentage of messages arriving later than the threshold time T is less than a very small target value, denoted as $\epsilon(T)$. The threshold time T may be pre-determined by the client devices and the centralized data server, in one embodiment. In one example, it is desirable that 99.9% of the messages arrive prior to the threshold time T.

In step 434, the latency tolerance T is divided into one or more transmission stages based on the RTT for the message. In one embodiment, the number of transmission stages of a message is determined as the ratio of the RTT and the latency tolerance. For example, the latency tolerance T of a message can be divided into 3 transmission stages for the message if the network latency tolerance T is set to be 750 ms and the round trip time is set to be 250 ms, in one embodiment.

In step 436, an optimal transmission action for each of the possible states (i, q) of the input message are determined. Here, q denotes the number of information packets that need to be transmitted during a transmission stage i. For example, suppose a message originally consists of k=4 information packets and the number of transmission stages i determined for the message is 3, then there are q=4 information packets to be transmitted during transmission stage i=1, and the state of the message (i, q)=(1, 4). In one embodiment, the different states of a message may be identified and represented in a Markov Decision Process (MDP) framework. As will be appreciated, a MDP framework is a probabilistic model of a sequential decision problem, where at each time step, the process is in an initial state and a current state and action selected by a decision maker determines the probability distribution of a set of future states.

In one embodiment, the optimal transmission action corresponds to a path leaving the input message, at a state (i, q) of the message. As will be appreciated, the optimal transmission action at each state (i, q) is determined by a policy, $\pi$, in a MDP framework. A mapping from states to actions in a MDP framework is referred to as a policy, which may be denoted as $\pi=\{\pi(i, q)\}$. For a given policy $\pi$, the transmission action at each state (i, q) is deterministic and defined by the policy itself. In one embodiment, the optimal transmission action for the input message at each identified state (i, q) of the input message is determined as described in steps (440-446) below.

Figure 5:
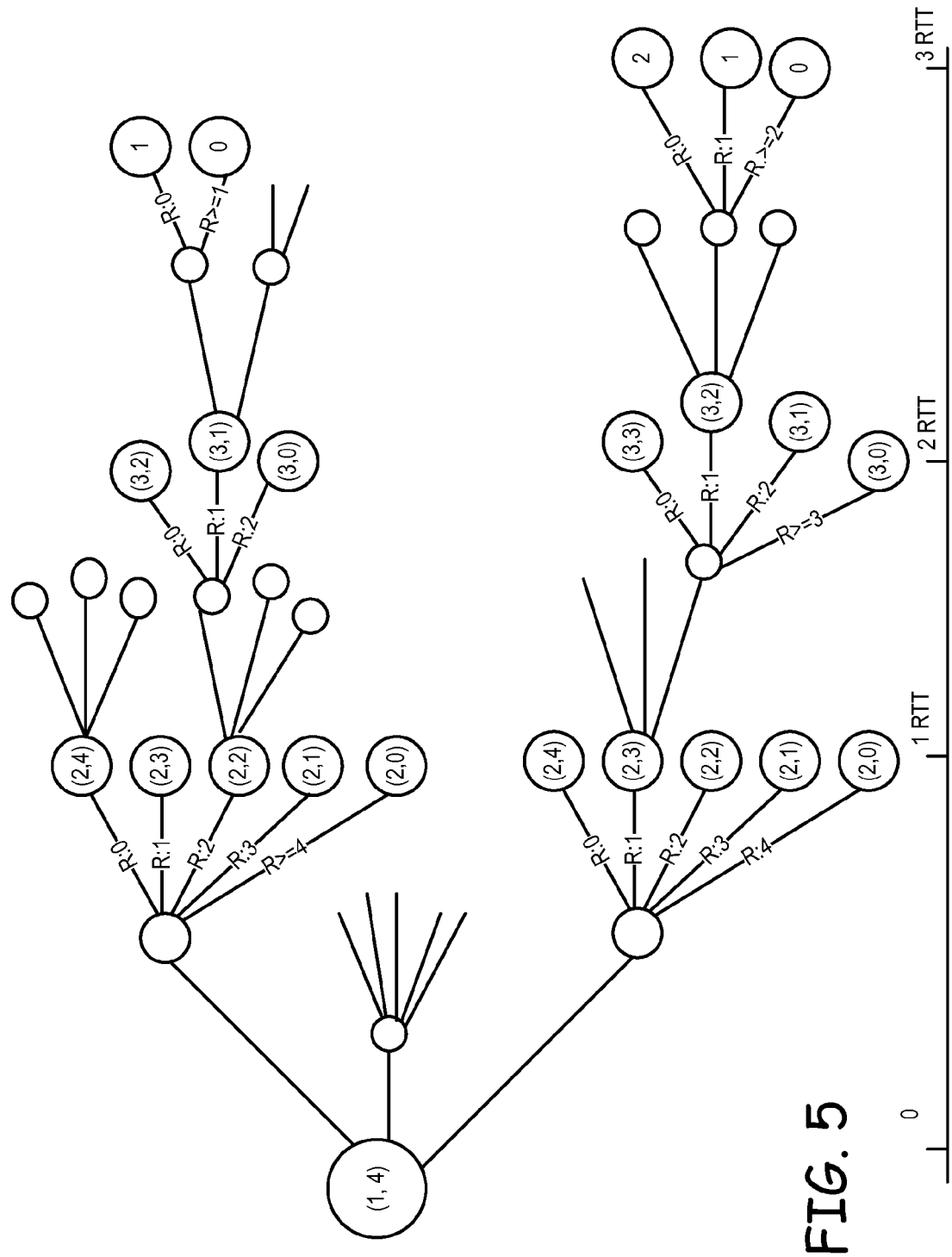
FIG. 5 illustrates an exemplary MDP framework that represents different possibilities of loss patterns that result in different states of a message.

In step 440, the packet loss probability p of each path leaving each of the identified states (i, q) of the input message is calculated. In one example, the packet loss probability p of each path is calculated as the compound probability of all loss patterns along the path. FIG. 5 illustrates an exemplary MDP framework that represents different possibilities of loss patterns that result in different states of a message. In the exemplary illustration shown in FIG. 5, the latency tolerance T of the input message is divided into 3 transmission stages. The message originally consists of 4 information packets and the initial state of the message is denoted by (i, q)=(1, 4). R:0, R:1, R:2, R:3 and R>=4 represent the different possibilities of loss patterns for the message at the initial state (1,4) at the end of the first transmission stage, i=1RTT. For example, R:0 denotes a loss pattern in which none of the 4 information packets of the message are received by the end of the first transmission stage. Similarly, R:2 denotes a loss pattern in which 2 of the 4 information packets of the message are received by the end of the first transmission stage, and so on. Similarly, and as illustrated in FIG. 5, each of the different loss patterns R:0, R:1, R:2, R:3 and R>=4 may result in one or more different states, (2, 4), (2, 3), (2, 2), (2, 1) and (2, 0) for the message, where each state may further lead to a different set of loss patterns for the message, and so on.

In one example, the compound probability of all loss patterns is computed by aggregating the loss patterns along the path that end in non-zero states in the final transmission stage 'i' of the input message. As used herein, a non-zero state for a message denotes that the message has not been delivered completely within the latency tolerance T. For example, the states (1) and (2) at the end of transmission stage, 3RTT in the exemplary MDP framework shown in FIG. 5 illustrate non-zero states for the input message. The probability that the input message cannot be delivered within the latency tolerance, T is then obtained based on the aggregation. This probability is equivalent to a fraction of messages arriving after T, which may be denoted as $\epsilon_\pi$.

In step 442, the transmission cost of delivery of the input message along each path is calculated as the total number of packets transmitted along the path. In step 444, the aggregated cost for transmission along each path is determined. Aggregating the costs on all the paths weighted by their probabilities, the average cost of delivery of the input message is obtained, which is denoted as $\rho_\pi$.

In step 446, the aggregated cost is compared across each path leaving the state (i, q) to determine the optimal transmission action for the state. In step 446, the optimal transmission action for the message state (i, q) is determined by determining the optimal transmission policy $\pi$. In one embodiment, the optimal policy $\pi$ minimizes the transmission cost and network latency associated with transmitting the input message, while ensuring that the probability of the message arriving later than the threshold T is below the threshold network latency. In particular, the optimal transmission action may be formulated as an optimization problem as shown in equation (1) below:

$$\min_\pi \rho_\pi \qquad (1)$$
$$s, t, \varepsilon_\pi \leq \varepsilon(T)$$

The optimal transmission action shown in equation (1) determines the optimal number of FEC packets to be added to the input message by minimizing the average number of FEC packets sent per message to each individual client device subject to the constraint that the fraction of messages that do not arrive within T seconds is less than the target value $\epsilon(T)$. As discussed above, the disclosed technology adapts to a wide range of varying network conditions by obtaining one or more network performance parameters such as the packet loss probability, network latency and RTT to dynamically determine the optimal transmission action for a message. In one embodiment, the disclosed technology may also dynamically adapt to the geographical location of the client devices to determine an optimal transmission action for a message. For example, the disclosed technology may revert to a pure timeout-based retransmission for client devices that are geographically close to the centralized data server to determine the optimal transmission action for a message. In one example, the optimal transmission action may include not sending any FEC packets along with the information packets in the message to a receiving device, when the client devices are geographically close to the server or for example, if the network performance parameters show that there are no packet losses. In other embodiments, the disclosed technology may also dynamically apply a timeout-based retransmission during earlier transmission stages of a message and determine an optimal transmission action for the message during later transmissions stages.

In one embodiment, the constrained optimization problem shown in equation (1) may be converted into an unconstrained optimization problem using a standard Lagrangian technique. A Lagrangian multiplier $\lambda$ is introduced and a combined objective function is defined as a weighted sum of the failure probability and transmission cost, denoted as shown in equation (2) below:

$$J_\pi(i,q) = \epsilon_\pi(i,q) + \lambda \rho_\pi(i,q) \qquad (2)$$

Here, $J_\pi(i,q)$ denotes the combined cost when beginning in the sub-trellis rooted in state (i, q). The objective function over the entire trellis is $J_\pi(1, k)$. For a given $\lambda$, the modified optimization problem which minimizes $J_\pi(1, k)$ may be solved to determine the optimal policy $\pi^*$ as shown in equation (3) below:

$$\pi^* = \operatorname*{argmin}_\pi J_\pi(1, k) \qquad (3)$$

For the optimal policy $\pi^*$ determined by a given $\lambda$, the message failure rate $\epsilon_\pi(1, k)$ is then evaluated, which may or may not satisfy the latency requirement constraint ($\epsilon_\pi \leq \epsilon_\pi(T)$). Hence, $\lambda$ is varied to find the closest value through bi-section search that just satisfies the constraint. As will be appreciated, this corresponds to finding a point on the convex-hull along the trade-off curve between the message failure rate and the transmission cost.

To solve the above modified optimization problem, the objective function of a particular trellis can be expressed in terms of its sub-trellises, as shown in equation (4) below:

$$J_\pi(i, q) = \lambda \pi(i, q) + \sum_{q'=0}^{q} p(q' \mid q, \pi(i, q)) J_\pi(i+1, q'), \qquad (4)$$

where $p(q'|q,\pi(i,q))$ represents the transitional probability from state (i, q) to state (i+1, q') by transmitting $\pi(i, q)$ number of packets. Given a model of packet loss, the transition probability can be readily calculated. For example, assuming the packet loss rate is uniform and denoted by p, the transition probability is calculated as shown in equation (5) below:

$$p(q' \mid q, a) = \begin{cases} 0 & \text{if } q < q' > q' + a \\ \sum_{r=q}^{a} \binom{a}{r}(1-p)^r p^{a-r} & \text{if } q' = 0 \\ \binom{a}{q-q'}(1-p)^{(q-q')} p^{(a-(q-q'))} & \text{if } 0 < q' \leq q \leq q' + a \end{cases} \qquad (5)$$

Also, the cost at the edge is computed as $J_\pi(I+1,q\neq0)=\epsilon_\pi(I+1,q)+\lambda\rho_\pi(I+1,q)=1$, since the failure probability and the transmission cost after the final stage I are $\epsilon_\pi(I+1,q)=1$ and $\rho_\pi(I+1,q)=0$, respectively. In addition, $J_\pi(I+1,q=0)=0$.

Let $J^*(i, q)$ and $\pi^*(i, q)$ define the minimum value of the objective function and the corresponding action, over the sub-trellis rooted at (i, q). Then $$J^*(i, q) = \min_a \left( \lambda a + \sum_{q'=0}^{q} p(q' \mid q, a) J^*(i+1, q') \right), \qquad (6)$$

$$\pi^*(i, q)) = \operatorname*{argmin}_a \left( \lambda a + \sum_{q'=0}^{q} p(q' \mid q, a) J^*(i+1, q') \right). \qquad (7)$$

By induction, it can be readily shown that $J^*(i, q) \leq J_\pi(i, q)$ for all (i, q) and all $\pi$, with equality achieved when $\pi=\pi^*$. Therefore, the problem of finding the optimal policy $\pi^*$ (shown in equation 3) can be solved efficiently using dynamic programming using the recursive equations 6 and 7. It is to be noted that the deterministic policy derived above is nearly optimal and sufficient for practical purposes.

Figure 6:
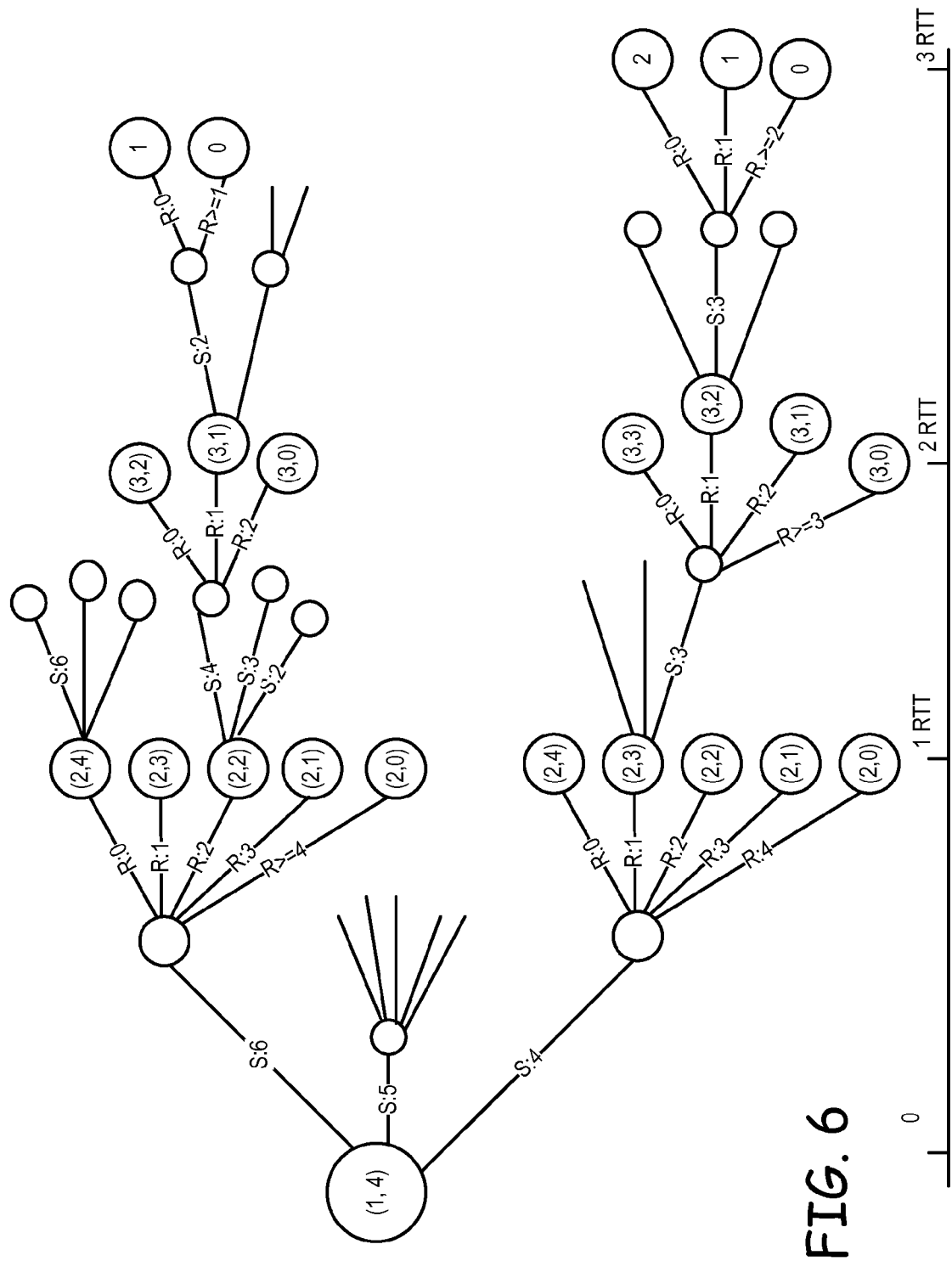
FIG. 6 shows an MDP framework that illustrates optimal transmission actions determined for a message.
Figure 7:
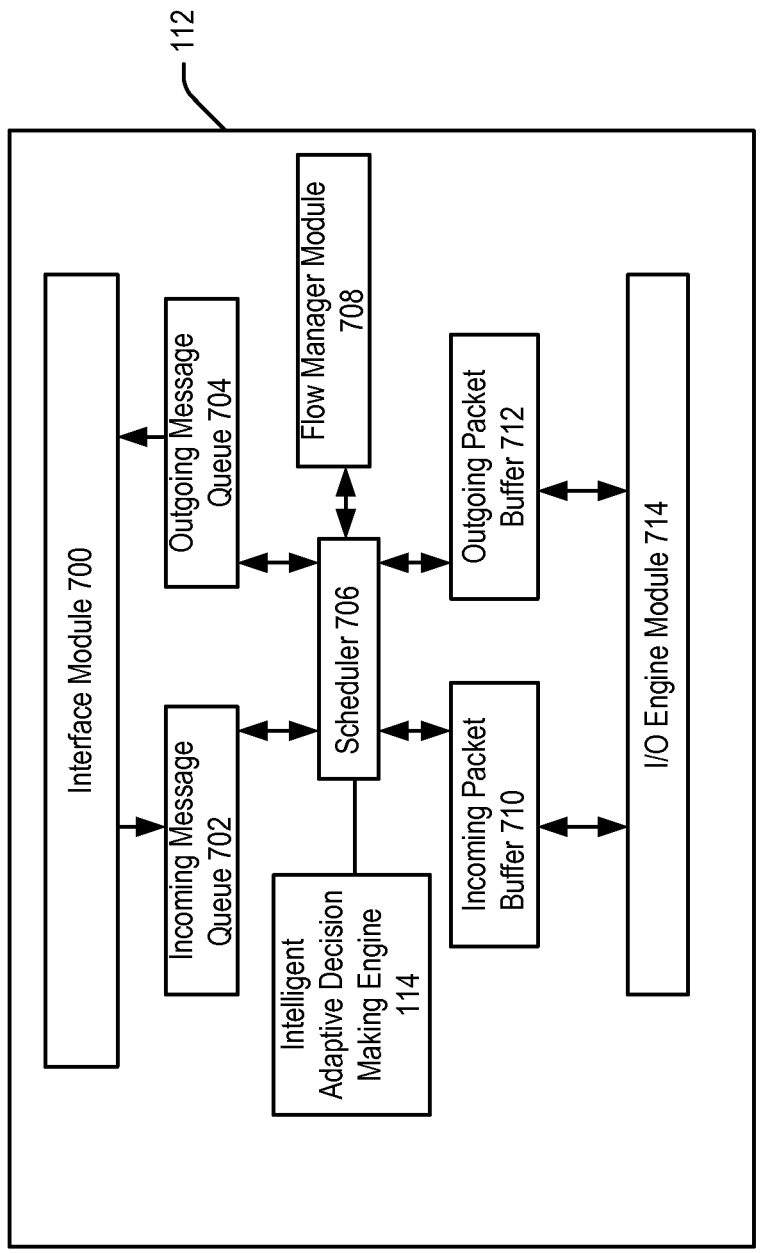
FIG. 7 describes an exemplary architecture of a message-oriented, connectionless User Datagram Protocol (UDP)-based protocol comprising an intelligent adaptive decision making engine.

FIG. 6 shows an MDP framework that illustrates one or more possible transmission actions for a message. In the exemplary illustration shown in FIG. 6, S:6, S:5 and S:4 denote the possible transmission actions for a message at an initial state (1, 4). Similarly, S:4, S:3 and S:2 denote the set of possible transmission actions for a message at a state (2,2) at the end of the first transmission stage. In one embodiment, the transmission actions for a message denote the number of FEC packets to be added to the message, prior to and during transmission of the message to a receiving device. For example, an optimal transmission action, S:6 for the message at the initial state (1, 4) denotes that 2 FEC packets are added to the message prior to transmitting the message to a receiving device at the beginning of transmission stage i=1. In one embodiment, the optimal transmission action for the message at state (1, 4) is determined as discussed in FIG. 4B. The optimal transmission action is pre-computed and stored in a look-up table. Similarly, the optimal transmission actions for each of the different message states (i, q) for the message are pre-computed and stored in separate look-up tables. In another embodiment, the optimal transmission actions and the look-up tables that store the optimal transmission actions for different states of a message may also be determined and created at real-time. In one example, each look-up table stores an optimal transmission action for a message, for a given state (i, q) of the message, a packet loss probability of the message, a transmission stage of the message, remaining transmission stages of the message, the number of remaining transmission stages of the message, the RTT and latency tolerance of the message. During online execution, the optimal transmission action is obtained using a table lookup, given the current state of the message (that is, the number of information packets that remain to be transmitted), the current transmission stage, the current estimate of the packet loss rate associated with the message and the RTT and the latency tolerance of the message.

An exemplary online execution performed by the disclosed technology may be more clearly understood by referring to the exemplary MDP framework illustrated in FIG. 6. Suppose that the optimal transmission action for a message at the initial state (1, 4) is $\pi(1, 4)=6$, denoted by S:6. The optimal transmission action, $\pi(1, 4)=6$ indicates that 6 packets will be transmitted during transmission stage 1, including 4 information packets and 2 redundant FEC packets. When packet loss occurs, the receiving device may receive less than 6 packets. If the receiving device receives 4 or more packets, the receiving device can recover the original message. In such cases, the message is successfully delivered by the end of transmission stage 1 and there is no need to transmit more packets in the next transmission stage. This is marked in FIG. 6 as a special ending state (2,0) at the end of stage 1. However, if the receiving device receives only 2 packets, marked as "R:2" in FIG. 6, then there are still 2 more information packets that need to be transmitted during the beginning of the second transmission stage. Therefore, the current state of the message (i, q) becomes (2, 2). The MDP framework is again utilized to choose the optimal transmission for the message at the new state (2, 2). In one embodiment, and as discussed above, the optimal transmission action for a current state of the message may be dynamically chosen using a table lookup, given the current stage of transmission, the current packet loss rate, the RTT and the latency tolerance. Depending on the loss events in the network, the optimal transmission action at state (2, 2) may lead to another state at the end of the second transmission stage, and so on. By the end of transmission stage 3, the message may still not be delivered completely, denoted by a non-zero state of the message at the end of transmission stage 3. In this case, the message fails to satisfy the latency tolerance T. It may be noted that since all the optimal transmission actions for different states of the message are pre-computed offline and stored as look-up tables, the disclosed technology eliminates the need of performing expensive optimization computations during online execution.

FIG. 7 describes an exemplary architecture of a message-oriented, connectionless User Datagram Protocol (UDP)-based protocol comprising an intelligent adaptive decision making engine. The disclosed UDP-based transport protocol 112 implements all the major functions of a transport protocol, such as maintaining per-flow status for each communicating end-point, estimating the parameters of communication channels, such as round trip time, packet loss rate and timeout period and delivering packets using a combination of FEC and retransmission, as determined by the intelligent adaptive decision making engine 114. The architecture of the protocol includes a set of APIs that support both synchronous and asynchronous message transfers.

The interface module 700 interacts with upper layer applications 106, 108 (shown in FIG. 1B) and provides applications 106, 108 with a variety of transport layer services which enable applications 106, 108 to communicate with each other and as necessary over the network 50 (shown in FIG. 1B). Outbound messages enter into an outgoing message queue 702 and wait to be processed by the scheduler 706. Inbound messages are assembled and placed into the incoming message queue 702 for applications 106, 108. The interface module 700 can be invoked via both synchronous and asynchronous APIs. The flow manager module 708 maintains per flow status. For each flow, identified by a set of parameters (IP address, port number), the flow manager module 708 creates a transmission control block (TCB) and keeps all the important information, such as the number of transmissions and losses, the message deadline, a sliding window, and other statistics. The sliding window controls the number of messages on the fly, that is, those still in transmission and not completely acknowledged. The number of transmissions and losses, together with the message deadline, are used as inputs to the intelligent adaptive decision making engine 114. The output of the intelligent adaptive decision making engine 114 is the optimal transmission action for each transmission stage as discussed in FIGS. 4-6.

The scheduler 706 is the core engine of the UDP-based protocol. It processes messages from the outgoing message queue 704, encodes them using the intelligent adaptive decision making engine 114, and enters prepared packets into the outgoing message queue 704. The scheduler 704 also decodes incoming packets from the incoming message queue 702, and enters assembled messages into the incoming message queue 702. The scheduler 706 also periodically triggers the flow manager module 708 to execute background tasks, such as retransmitting timeout packets, cleaning up obsolete TCBs, and so on.

The Input/Output (I/O) engine module 714 is in charge of sending and receiving individual packets. In one embodiment, the I/O engine module 714 is implemented using an Input/Output (I/O) completion port to support the throughput and scalability requirements of high concurrency game servers in the service data center.

In another embodiment of the disclosed technology, the intelligent adaptive decision making engine 114 also takes into consideration the congestion in the network prior to determining the optimal number of FEC packets to add to a message. As will be appreciated, in the event of network congestion, adding FEC packets to a message may further effect the network congestion especially when there are multiple messages to be transmitted simultaneously. In one embodiment, the intelligent adaptive decision making engine 114 obtains feedback about packet delay and loss to determine a fair share of the network bandwidth so that a low queuing delay can be maintained even during network congestion. In one embodiment, the intelligent adaptive decision making engine 114 determines the optimal transmission action for a group of messages transmitted between the one or more client devices 100A, 100B ... 100X and the centralized data server 110 as discussed in FIG. 8 below.

Figure 8:
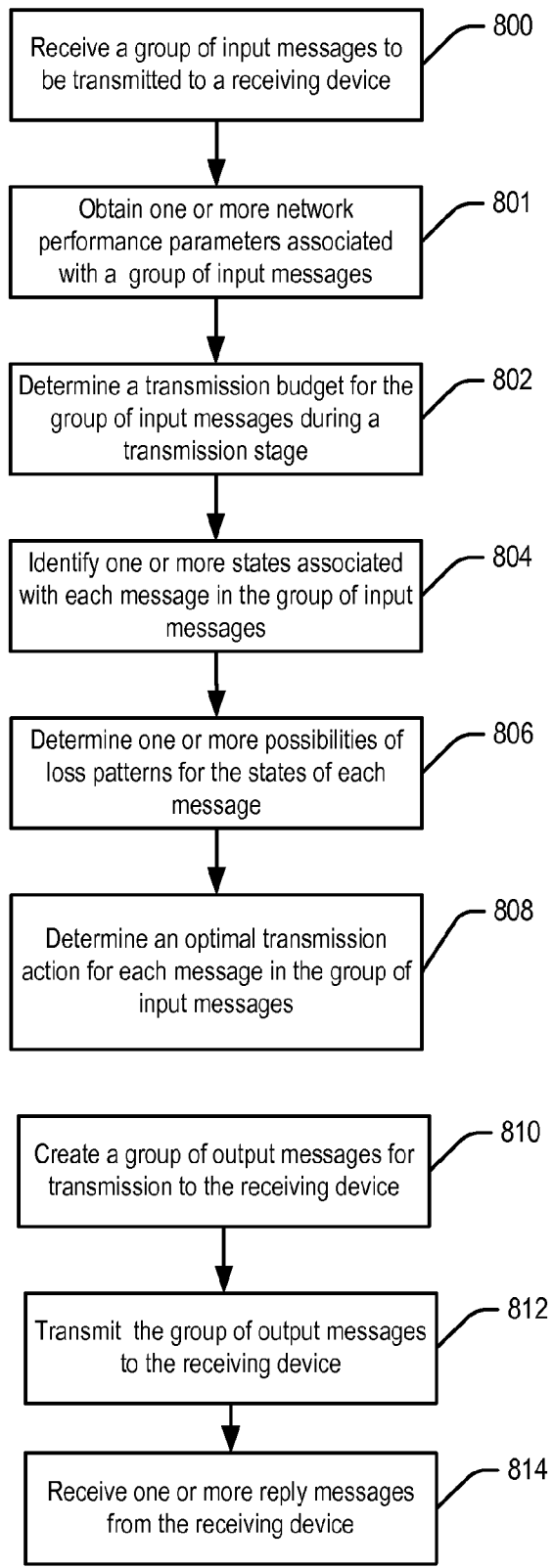
FIG. 8 is a flowchart describing a process for dynamically determining an optimal transmission action for a group of messages transmitted between one or more client devices and a centralized data server.

FIG. 8 is a flowchart describing a process for dynamically determining an optimal transmission action for a group of messages transmitted between one or more client devices and a centralized data server. In step 800, a group of input messages to be transmitted to a receiving device, are received. In one example, the group of input messages may be generated by an interactive application such as the MMO game shown in FIG. 1A. In step 801, one or more network performance parameters associated with the group of input messages is obtained. As discussed in FIG. 4, in one example, the network performance parameters may include the round trip time (RTT), the network latency and the packet loss probability of a message transmitted between the client devices 100A, 100B ... 100X and the centralized data server 110.

In step 802, a transmission budget $B_i$ for the group of input messages during a transmission stage i associated with the group of input messages is determined. As used herein, the transmission budget refers to the number of messages that are transmitted during a transmission stage i. The number of transmission stages for the group of input messages may be determined as the ratio of the RTT and the latency tolerance as discussed in FIG. 4.

In step 804, one or more states associated with each message in the group of input messages are identified. In step 806, one or more possibilities of loss patterns for the one or more states associated with each message are determined. In one example, and as discussed in FIG. 4, the different possibilities of loss patterns of a message that result in different states of the message may be identified and represented in a Markov Decision Process (MDP) framework.

In step 808, an optimal transmission action for the different states of each of the messages in the group of input messages, M, is determined based on the one or more network performance parameters, the one or more states and the one or more possibilities of loss patterns. In one embodiment, the optimal transmission action minimizes a transmission cost and network latency associated with transmitting each of the messages in the group of messages and may be represented as shown in equation (8) below:

$$\min_{\pi_m} \sum_{m=1}^{M} \rho_{\pi_m} \text{ s.t. } \varepsilon_{\pi_m} \leq \varepsilon(T) \text{ and } \sum_{m=1}^{M} \pi_m(i) \leq B_i \quad (8)$$

where i, $B_i$ and m denote the transmission stage ($1 \leq i \leq I$), the budget or bandwidth constraint at stage i and the message index ($1 \leq m \leq M$), respectively. $\pi_m(i)$ is a simplified representation of $\pi_m(i, q_1, q_2, \ldots, q_m)$, which denotes the transmission action of a message m at transmission stage i, given the states of the group of M input messages.

As will be appreciated, solving the optimization problem shown in equation (8) involves representing all the combinations of the states from the individual messages. To simplify the optimization and obtain a low complexity solution, the following approximations may be made. First, an assumption is made that the Lagrangian multiplier $\lambda^*$ discovered without the budget or bandwidth constraint represents a satisfactory trade-off between the message delivery latency and the transmission cost. Hence, the objective function is modified to incorporate the latency constraint into the objective function, which in turn becomes a combination of the latency and the cost, weighted by $\lambda^*$. Secondly, the optimization problem shown in FIG. (8) is solved for a current transmission stage and the budget or bandwidth constraint is not taken into consideration for future transmission stages. When a future transmission stage becomes current, the optimization at that transmission stage ensures that all the actions satisfy the budget or bandwidth constraint. Therefore, the modified optimization problem is denoted as shown in equation (9) below:

$$\min_{\pi_m} \sum_{m=1}^{M} (\varepsilon_{\pi_m} + \lambda_m^* \rho_{\pi_m}) \text{ s.t. } \sum_{m=1}^{M} \pi_m(1) \leq B_1 \quad (9)$$

where $\lambda_m^*$ corresponds to the optimal policy of message m without the budget or bandwidth constraint.

As will be appreciated, the equation shown in FIG. (9) may be viewed as a classic knapsack problem to determine how to allocate the transmission budget $B_1$ among the M messages so that a total cost can be minimized. Hence, an optimal solution can be readily derived using dynamic programming, when the total cost is well-defined given a specific allocation. If $\{b_m\}$ denotes an allocation, where $b_m$ packets are transmitted by message m, the total cost can be represented as shown in equation (10) below:

$$C = \sum_{m=1}^{M} \left( \lambda_m b_m + \sum_{q'=0}^{q} p(q' | q, b_m) J_m^*(2, q') \right) \quad (10)$$

where $J_m^*(2,q')$ is the optimal cost of message m at stage 2 given state q'. Since the budget or bandwidth constraint is dropped for all the future stages (including stage 2), $J_m^*(2, q')$ can be calculated independently for each message without the budget or bandwidth constraint and is the same as equation (6). As discussed before, the optimal transmission actions $J^*(i,q')$'s for different states of each message in the group of messages can be pre-computed offline and stored in look-up tables.

In step 810, a group of output messages for transmission to the receiving device are created based on the optimal transmission action determined for each message in the group of input messages. In one embodiment, the group of output messages includes the optimal number of redundant FEC packets and the information packets in each message in the group of input messages. In step 812, the group of output messages is transmitted to the receiving device. In step 814, one or more reply messages are received from the receiving device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method comprising:
receiving an input message to be transmitted to a receiving device, wherein the input message includes one or more information packets;
dynamically and automatically determining an optimal transmission action for the input message based on monitoring one or more network performance parameters in real-time and based on the one or more information packets in the input message, wherein determining the optimal transmission action for the input message comprises:
  determining an optimal transmission action for each state of the input message, comprising:
  determining a packet loss probability of each path leaving each state of the input message, wherein the packet loss probability of each path is calculated as a compound probability of loss patterns along each path;
  determining a transmission cost of delivery of the input message along each path for each state of the input message;
  determining an aggregated cost of transmission for all paths for each state of the input message; and
  comparing the aggregated cost of transmission with the transmission cost of delivery of the input message along each path for each state of the input message to determine the optimal transmission action for each state of the input message, wherein the optimal transmission action for the input message minimizes a transmission cost and network latency associated with transmitting the input message, subject to a constraint that a probability of non-arrival of the input message along a path is below a threshold value, and
  defining a combined objective function for the input message as a weighted sum of a failure probability and the transmission cost associated with transmitting the input message, utilizing a Lagrangian multiplier $\lambda$;
  determining an optimal number of forward error correction packets to add to the input message prior to and during transmission of the input message to the receiving device based on the determined optimal transmission action for the input message;
generating the forward error correction packets;
creating an output message for transmission to the receiving device, wherein the output message includes the one or more information packets in the input message and the optimal number of forward error correction packets;
transmitting the output message to the receiving device;
receiving a reply message from the receiving device; and
wherein the steps of determining the optimal transmission action for the input message, generating the one or more forward error correction packets, creating the output message and receiving the reply message is performed iteratively for different states of the input message until the input message is delivered at the receiving device or until a network threshold latency has been reached.

2. The method of claim 1, wherein the one or more network performance parameters comprise one or more of a round trip time (RTT), a network latency, and a packet loss probability of a message transmitted between one or more client devices and a centralized data server.

3. The method of claim 1, wherein dynamically and automatically determining the optimal transmission action for the input message further comprises:
varying the Lagrangian multiplier $\lambda$ using bi-section search to determine the optimal transmission action for the input message.

4. The method of claim 1, wherein dynamically and automatically determining the optimal transmission action for the input message further comprises:
creating one or more look-up tables to store the optimal transmission action determined for the input message in real-time, wherein each look-up table stores the optimal transmission action for the input message for a given state of the input message, a packet loss probability of the input message, a transmission stage of the input message and a number of remaining transmission stages of the input message; and
dynamically choosing the optimal transmission action for the input message during online execution utilizing the one or more look-up tables.

5. The method of claim 1, wherein dynamically and automatically determining the optimal transmission action for the input message further comprises:
creating one or more look-up tables to store the optimal transmission action determined for the input message offline, wherein each look-up table stores the optimal transmission action for the input message for a given state of the input message, a packet loss probability of the input message, a transmission stage of the input message and remaining transmission stages of the input message;
and dynamically choosing the optimal transmission action for the input message during online execution utilizing the one or more look-up tables.

6. The method of claim 1, wherein the optimal transmission action for the input message minimizes transmission cost and network latency associated with transmitting the input message between one or more client devices and a centralized data server.

7. A method comprising:
receiving an input message to be transmitted to a receiving device, wherein the input message includes one or more information packets;
dynamically and automatically determining an optimal transmission action for the input message based on monitoring one or more network performance parameters in real-time and based on the one or more information packets in the input message, wherein determining the optimal transmission action for the input message comprises:
determining a packet loss probability of each path leaving each state of the input message, utilizing a Markov Decision Process (MDP) framework, wherein the packet loss probability of each path is calculated as a compound probability of loss patterns along each path,
determining a transmission cost of delivery of the input message along each path,
determining an aggregated cost of transmission for all paths of the input message,
comparing the aggregated cost of transmission with the transmission cost of delivery of the input message along each path for each state of the input message to determine an optimal transmission action for each state of the input message, wherein the optimal transmission action for the input message minimizes a transmission cost and network latency associated with transmitting the input message, subject to a constraint that a probability of non-arrival of the input message along a path is below a threshold value, defining a combined objective function for the input message as a weighted sum of a failure probability and the transmission cost associated with transmitting the input message, utilizing a Lagrangian multiplier $\lambda$, and varying the Lagrangian multiplier $\lambda$, using bi-section search to determine the optimal transmission action for the input;

determining an optimal number of forward error correction packets to add to the input message prior to and during transmission of the input message to the receiving device based on the determined optimal transmission action for the input message; generating the forward error correction packets;

creating an output message for transmission to the receiving device, wherein the output message includes the one or more information packets in the input message and the optimal number of forward error correction packets; transmitting the output message to the receiving device; and receiving a reply message from the receiving device.

8. A system comprising:

one or more client devices in communication with a centralized data server via a communications network;

one or more applications hosted on the one or more client devices and the centralized data server, wherein the one or more applications generate one or more messages that include a sequence of one or more information packets;

an intelligent adaptive decision making engine hosted on the one or more client devices and the centralized data server, the intelligent adaptive decision making engine operable to determine an optimal transmission action for the one or more messages including being operable to determine an optimal number of forward error correction (FEC) packets to add to the one or more messages prior to and during transmission of the one or more messages between the one or more client devices and the centralized data server based on the determined optimal transmission action for the one or more messages; and wherein the intelligent adaptive decision making engine determines the optimal transmission action for the one or more messages further comprises:

the intelligent adaptive decision making engine operable to determine an optimal transmission action for each state of the one or more messages, comprising:

the intelligent adaptive decision making engine operable to determine a packet loss probability of each path leaving each state of the one or more messages, wherein the packet loss probability of each path is calculated as a compound probability of loss patterns along each path, the intelligent adaptive decision making engine operable to determine a transmission cost of delivery of the one or more messages along each path for each state of the one or more messages, the intelligent adaptive decision making engine operable to determine an aggregated cost of transmission for all paths for each state of the one or more messages, the intelligent adaptive decision making engine operable to compare the aggregated cost of transmission with the transmission cost of delivery of the one or more messages along each path for each state of the one or more messages to determine the optimal transmission action for each state of the one or more messages, wherein the optimal transmission action for the one or more messages minimizes a transmission cost and network latency associated with transmitting the one or more messages, subject to a constraint that a probability of non-arrival of the one or more messages along a path is below a threshold value, and the intelligent adaptive decision making engine operable to define a combined objective function for the one or more messages as a weighted sum of a failure probability and the transmission cost associated with transmitting the one or more messages, utilizing a Lagrangian multiplier $\lambda$;

the intelligent adaptive decision making engine operable to generate the forward error correction packets;

the intelligent adaptive decision making engine operable to create one or more output messages for transmission to the receiving device, wherein the one or more output messages include the one or more information packets of the one or more messages and the optimal number of forward error correction packets;

the intelligent adaptive decision making engine operable to transmit the one or more output messages to the receiving device; and the intelligent adaptive decision making engine operable to receive one or more reply messages from the receiving device.

9. The system of claim 8, wherein the optimal transmission action for the one or more messages minimizes a transmission cost and network latency associated with transmitting the one or more messages between the one or more client devices and the centralized data server.

10. The system of claim 8, wherein the one or more applications comprise one or more interactive internet applications, wherein the one or more interactive internet applications include a Massively Multiplayer Online (MMO) game.

11. The method of claim 1, wherein dynamically and automatically determining the optimal transmission action for the input message further comprises:

identifying one or more states associated with the input message and determining one or more possibilities of loss patterns for the one or more states of the input message, wherein each state identifies the number of information packets to be transmitted in the input message during a particular transmission stage associated with the input message; and representing the one or more states and the one or more possibilities of loss patterns of the input message in a Markov Decision Process (MDP) framework.

* * * * *